United States Patent
Gaonkar et al.

(10) Patent No.: US 9,250,946 B2
(45) Date of Patent: Feb. 2, 2016

(54) EFFICIENT PROVISIONING OF CLONED VIRTUAL MACHINE IMAGES USING DEDUPLICATION METADATA

(71) Applicant: Atlantis Computing, Inc., Mountain View, CA (US)

(72) Inventors: Shravan Gaonkar, Gainesville, FL (US); Sagar Dixit, Mountain View, CA (US); Kartikeya Iyer, Campbell, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 95 days.

(21) Appl. No.: 13/765,687

(22) Filed: Feb. 12, 2013

(65) Prior Publication Data
US 2014/0229936 A1  Aug. 14, 2014

(51) Int. Cl.
G06F 9/455 (2006.01)
G06F 7/00 (2006.01)
G06F 13/00 (2006.01)
G06F 11/00 (2006.01)

(52) U.S. Cl.
CPC .. *G06F 9/45558* (2013.01); *G06F 2009/45562* (2013.01)

(58) Field of Classification Search
CPC ............... G06F 17/30575; G06F 17/30156; G06F 3/0641; G06F 11/1453; G06F 9/455; G06F 2009/45562
See application file for complete search history.

(56) References Cited

U.S. PATENT DOCUMENTS

| | | |
|---|---|---|
| 4,603,380 A | 7/1986 | Easton et al. |
| 6,675,214 B2 | 1/2004 | Stewart et al. |
| 6,807,619 B1 | 10/2004 | Ezra et al. |
| 6,915,302 B1 | 7/2005 | Christofferson et al. |
| 7,269,608 B2 | 9/2007 | Wong et al. |
| 7,356,651 B2 | 4/2008 | Liu et al. |
| 7,571,288 B2 | 8/2009 | Pudipeddi et al. |
| 7,908,436 B1 | 3/2011 | Srinivasan et al. |
| 8,046,446 B1 | 10/2011 | Karr et al. |
| 8,117,464 B1 | 2/2012 | Kogelnik |
| 8,312,471 B2 | 11/2012 | Davis |
| 8,495,288 B2 | 7/2013 | Hosoya et al. |
| 8,566,821 B2 * | 10/2013 | Robinson et al. ................. 718/1 |
| 8,732,401 B2 | 5/2014 | Venkatesh et al. |
| 2002/0124137 A1 | 9/2002 | Ulrich et al. |
| 2003/0145045 A1 | 7/2003 | Pellegrino et al. |
| 2003/0188045 A1 | 10/2003 | Jacobson |
| 2004/0111443 A1 | 6/2004 | Wong et al. |
| 2004/0128470 A1 | 7/2004 | Hetzler et al. |
| 2005/0038850 A1 | 2/2005 | Oe et al. |
| 2005/0108440 A1 | 5/2005 | Baumberger et al. |
| 2005/0114595 A1 | 5/2005 | Karr et al. |

(Continued)

*Primary Examiner* — Wissam Rashid
(74) *Attorney, Agent, or Firm* — Blakely, Sokoloff, Taylor & Zafman LLP

(57) ABSTRACT

Techniques for fast provisioning of virtual machine images using deduplication metadata are described, including receiving a request to copy a first virtual machine to form a second virtual machine, identifying a first portion of memory comprising data for the first virtual machine; and forming the second virtual machine based on the first portion of memory comprising data for the first virtual machine, wherein forming the second virtual machine further comprises linking the second virtual machine to the first portion of memory comprising data for the first virtual machine, and implementing a second portion of memory to store data for the second virtual machine independent of the first virtual machine.

14 Claims, 7 Drawing Sheets

(56) References Cited

U.S. PATENT DOCUMENTS

| | | |
|---|---|---|
| 2005/0131900 A1 | 6/2005 | Palliyll et al. |
| 2006/0112251 A1 | 5/2006 | Karr et al. |
| 2006/0272015 A1 | 11/2006 | Frank et al. |
| 2007/0005935 A1 | 1/2007 | Khosravi et al. |
| 2007/0192534 A1 | 8/2007 | Hwang et al. |
| 2007/0248029 A1 | 10/2007 | Merkey et al. |
| 2007/0260702 A1* | 11/2007 | Richardson et al. .......... 709/217 |
| 2007/0266037 A1 | 11/2007 | Terry et al. |
| 2008/0183986 A1 | 7/2008 | Yehia et al. |
| 2009/0063528 A1 | 3/2009 | Yueh |
| 2009/0063795 A1 | 3/2009 | Yueh |
| 2009/0089337 A1 | 4/2009 | Perlin et al. |
| 2009/0254507 A1 | 10/2009 | Hosoya et al. |
| 2009/0319772 A1 | 12/2009 | Singh et al. |
| 2010/0031000 A1 | 2/2010 | Flynn et al. |
| 2010/0064166 A1 | 3/2010 | Dubnicki et al. |
| 2010/0070725 A1 | 3/2010 | Prahlad et al. |
| 2010/0180153 A1 | 7/2010 | Jernigan, IV et al. |
| 2010/0181119 A1 | 7/2010 | Saigh et al. |
| 2010/0188273 A1 | 7/2010 | He et al. |
| 2010/0274772 A1 | 10/2010 | Samuels |
| 2010/0306444 A1 | 12/2010 | Shirley et al. |
| 2010/0332401 A1 | 12/2010 | Prahlad et al. |
| 2011/0035620 A1 | 2/2011 | Elyashev |
| 2011/0055471 A1 | 3/2011 | Thatcher et al. |
| 2011/0071989 A1 | 3/2011 | Wilson et al. |
| 2011/0082836 A1 | 4/2011 | Wang et al. |
| 2011/0131390 A1* | 6/2011 | Srinivasan et al. ............ 711/209 |
| 2011/0145243 A1 | 6/2011 | Yudenfriend |
| 2011/0167045 A1 | 7/2011 | Okamoto |
| 2011/0196900 A1 | 8/2011 | Drobychev et al. |
| 2011/0265083 A1 | 10/2011 | Davis |
| 2011/0276781 A1 | 11/2011 | Sengupta et al. |
| 2011/0295914 A1 | 12/2011 | Mori |
| 2012/0016845 A1 | 1/2012 | Bates |
| 2012/0054445 A1 | 3/2012 | Swart et al. |
| 2012/0137054 A1 | 5/2012 | Sadri et al. |
| 2012/0151477 A1* | 6/2012 | Sinha et al. ...................... 718/1 |
| 2012/0159115 A1 | 6/2012 | Cha et al. |
| 2012/0254131 A1 | 10/2012 | Kiswany et al. |
| 2013/0013865 A1 | 1/2013 | Venkatesh et al. |
| 2013/0117494 A1 | 5/2013 | Hughes et al. |
| 2013/0124523 A1 | 5/2013 | Rogers et al. |
| 2013/0166831 A1 | 6/2013 | Atkisson et al. |
| 2013/0238876 A1 | 9/2013 | Fiske et al. |
| 2013/0282627 A1 | 10/2013 | Faddoul et al. |
| 2013/0283004 A1 | 10/2013 | Devine et al. |

* cited by examiner

EFFICIENT PROVISIONING OF CLONED VIRTUAL MACHINE IMAGES USING DEDUPLICATION METADATA

CROSS-REFERENCE TO RELATED APPLICATIONS

This application is related to U.S. Nonprovisional patent application Ser. No. 13/765,689, filed concurrently, which is herein incorporated by reference in its entirety and for all purposes.

FIELD OF THE INVENTION

Embodiments of the invention relates generally to software, data storage, and virtualized computing and processing resources. More specifically, techniques for efficient provisioning of cloned virtual machine using deduplication metadata are described.

BACKGROUND OF THE INVENTION

Conventional solutions for cloning virtual machine images can be very time consuming and expensive operations. A full clone (or full copy) of a virtual machine requires reading the source virtual machine image block by block and copying each block to the cloned virtual machine image. This is a relatively time-consuming operation since the sizes of virtual machine are hundreds of gigabytes large or greater, and a transfer of data for full clone of a single virtual machine can take many hours to complete.

Moreover, a rapidly-growing demand of virtualized systems and machines means hundreds of thousands of virtual machines may need to be deployed at any given time. Conventional solutions of cloning these hundreds of thousands of virtual machines is cost prohibitive and time consuming and do not scale effectively with the relatively large number of virtual machines required for deployment, even if the underlying file system of the virtual machines is deduplicated.

Thus, what is needed is a solution for improving the cost and efficiency of cloning images of virtual machines without the limitations of conventional techniques.

BRIEF DESCRIPTION OF THE DRAWINGS

Various embodiments of the invention are disclosed in the following detailed description and the accompanying drawings.

DETAILED DESCRIPTION

Figure 1:
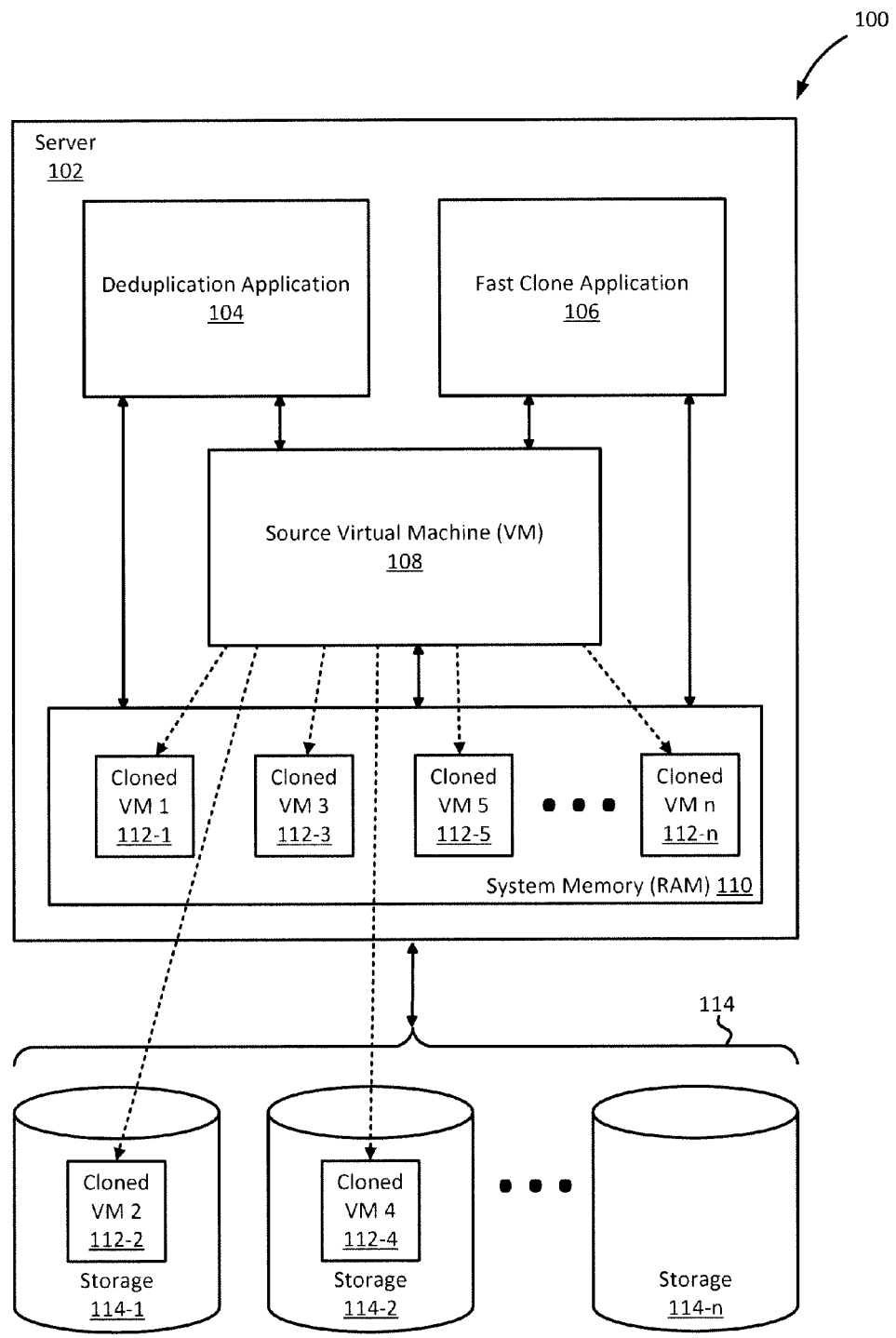
FIG. 1 illustrates an example of a system to form new virtual machines (VMs) associated with data representing a source virtual machine in accordance with at least one embodiment.

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. The described techniques may be varied and are not limited to the examples or descriptions provided.

As described herein, techniques for efficient provisioning of virtual machine images by copying (or cloning) data using deduplication metadata are described. The described techniques may be performed in real-time or substantially real-time, cloning source virtual machines and forming new virtual machines using a fast-clone application. The fast cloning techniques described result in the formation of multiple new virtual machines that are cloned instances of a source virtual machine without copying the underlying data of the source virtual machine. Further, the described techniques can significantly reduce the amount of time required to create new virtual machines by creating the new virtual machines without copying any of the data of the source virtual machine. Still further, the described techniques may reduce the amount of storage required for the new virtual machines as the cloned virtual machines need not be created by copying the files of the source virtual machine. In some examples, the described virtual machine cloning techniques may also improve scalability of virtualized networks by significantly shortening the time required to deploy mass quantities of virtual machines. Additionally, the described virtual machine cloning techniques can also be used to create new virtual machines in system memory, such as RAM, where data can be accessed quickly but data-storing capacity can be limited.

FIG. 1 illustrates an example of a system to form new virtual machines (VMs) associated with data representing a source virtual machine in accordance with at least one embodiment. As shown in diagram 100, an example of a system to form new virtual machines from a source virtual machine can include server 102, deduplication application 104, fast clone application 106, source virtual machine (VM) 108, system memory (RAM) 110, cloned VMs 112-1 to 112-n, and storage array 114 (including storage 114-1 to 114-n). In some embodiments, deduplication application 104 can be configured to eliminate duplicate copies of repeating data to effect a form of data compression to maximize storage (e.g., storage array 114, non-volatile memory, and volatile memory). In a deduplication-based file system, deduplication application 104 can identify and eliminate duplicate copies of repeating data and implement a reference link to point to the original data, thereby eliminating duplicate data, according to some embodiments. For example, deduplication application 104 can store the reference link between the eliminated duplicate data and the original data in the form of deduplication metadata, which functions to describe the relationship between the original data and the deduplicated data. Examples of techniques associated with deduplication of virtual machine files are described in copending U.S. patent application Ser. No. 13/269,525, filed Oct. 7, 2011, entitled "Deduplication of Virtual Machine Files in a Virtualized Desktop Environment," which is incorporated herein by reference in its entirety for all purposes.

In some embodiments, deduplication application 104 can store the deduplication metadata in a metadata file or table used to describe or map all of the relationships between the deduplicated data and the original data. For example, a metadata file or table can contain data representing a block number that is associated with the physical location or data block of the data in a storage device in a duduplicated file system. Such a data block can contain data representing information such as a block number, data associated with a hash value generated by a hashing function (e.g., SHA-1 or MD5) that uniquely identifies the data in the data block, and data associated with a reference link counter to track the number of times a reference link associated with the data block is implemented.

According to some embodiments, fast clone application 106 can be configured to receive a request to clone a virtual machine and to initiate cloning of the virtual machine. Upon receiving a request to clone a virtual machine, fast clone application 106 can locate and identify a source virtual machine 108 to be used to clone virtual machines by, for example, forming new virtual machines, according to some implementations. In some embodiments, source virtual machine 108 is deduplicated using a deduplication algorithm by deduplication application 104, whereby files containing deduplication metadata of the deduplicated virtual machine can be created by deduplication application 104. In some implementations, fast clone application 106 can use the deduplication metadata of source virtual machine 108 generated by deduplication application 104 to form new (or cloned) instances of virtual machines, such as cloned VMs 112-1 to 112-n. In some embodiments, new VMs can be formed in storage array 114 (e.g., cloned VM 112-2 in storage 114-1 and cloned VM 112-4 in storage 114-2). In some embodiments, new VMs can be formed in system memory (RAM) 110 (e.g., cloned VM 112-1, cloned VM 112-3, cloned VM 112-5, and cloned VM 112-n). In other embodiments, any number of instances of new virtual machines can be formed in any of the storage devices available to server 102, such as storage array 114, and/or system memory (RAM) 110 (e.g., cloned VMs 112-1-112-n).

Figure 2:
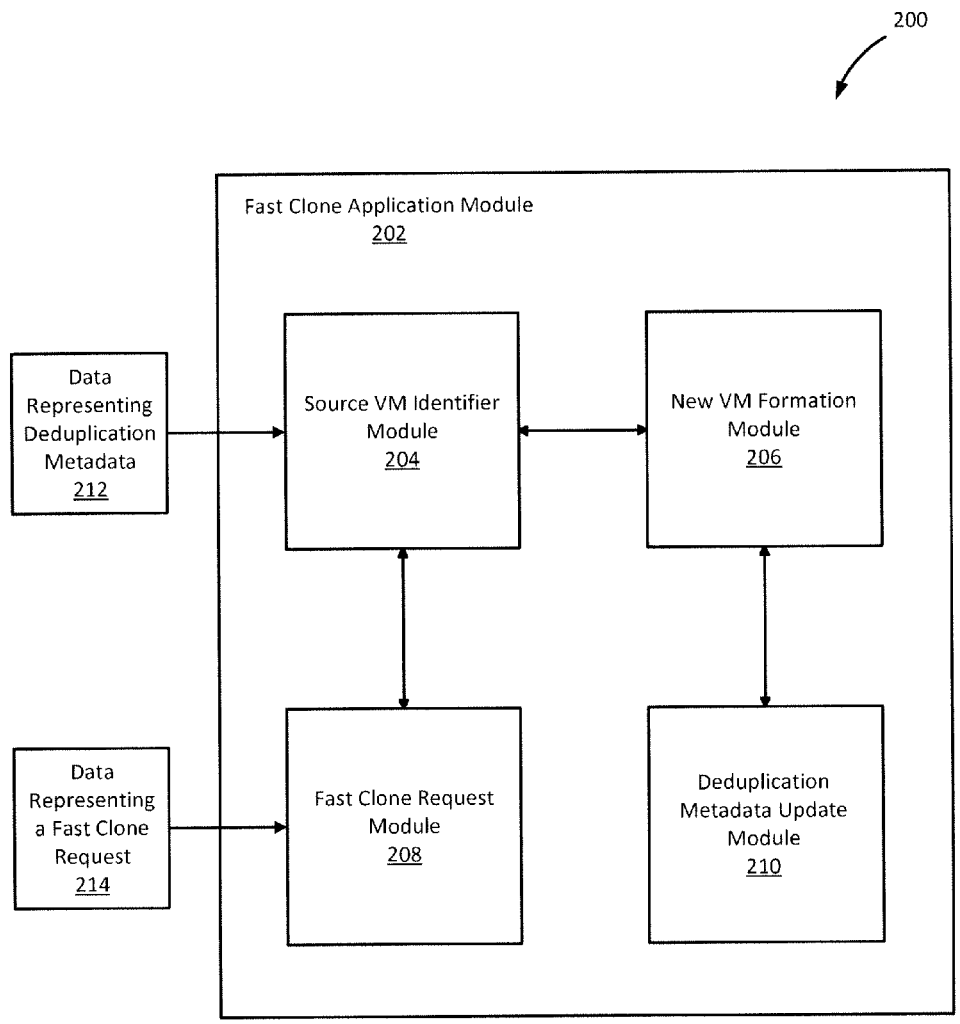
FIG. 2 illustrates an example of a fast clone application module according to some embodiments.

FIG. 2 illustrates an example of a fast clone application module according to some embodiments. As shown in diagram 200, fast clone application 202 can include fast clone request module 208, source VM identifier module 204, new VM formation module 206, and deduplication metadata update module 210, according to some embodiments. In some embodiments, fast clone request module 208 can be configured to receive data representing a fast clone request 214 and to initiate fast cloning of the source virtual machine, such as source virtual machine 108 described in FIG. 1 to form new VMs, such as cloned VMs 112-1 to 112-n, also described in FIG. 1. As used herein, the term "fast clone" can refer to the efficient and/or effective cloning or formation of new virtual machines using deduplication metadata of a source virtual machine. In some implementations, source VM identifier module 204 can be configured to locate and/or identify an image of a deduplicated source virtual machine to be fast cloned. In some embodiments, source VM identifier module 204 can be configured to notify the source of the data representing a fast clone request 214 (e.g., network administrator, host server, or authorized user) that an image (or copy) of a source virtual machine should be loaded (or copied or mounted) onto the server. Source VM identifier module 204 can be configured to receive data representing deduplication metadata 212 of a source virtual machine once a source virtual machine has been located and identified, according to an embodiment.

New VM formation module 206 can be configured to clone a source virtual machine to form a new (or cloned) virtual machine by copying only the deduplication metadata of the source virtual machine to form the new virtual machine, according to some implementations. A technique for cloning a source virtual machine to form a new or cloned virtual machine is described in detail below. Deduplication metadata update module 210 can be configured to modify the deduplication metadata of the source virtual machine after the deduplication metadata of the source virtual machine has been used to form a new virtual machine, according to some implementations. In some embodiments, the deduplication metadata can include data associated with a reference link counter to track the number of times a reference link associating the data block with an eliminated redundant data block is implemented in a deduplicated system. When instances of virtual machines are formed using the deduplication metadata of the source virtual machine, reference links are implemented to associate the redundant data of the new virtual machine with the original data, and the data associated with the reference link counters in the deduplicated metadata of the source virtual machine is modified to represent an increment each time a new reference link is implemented to associate the redundant data of the new virtual machine with the original data of the source virtual machine, according to some embodiments. The techniques for cloning a source virtual machine to form a cloned virtual machine are described in detail below.

Figure 3:
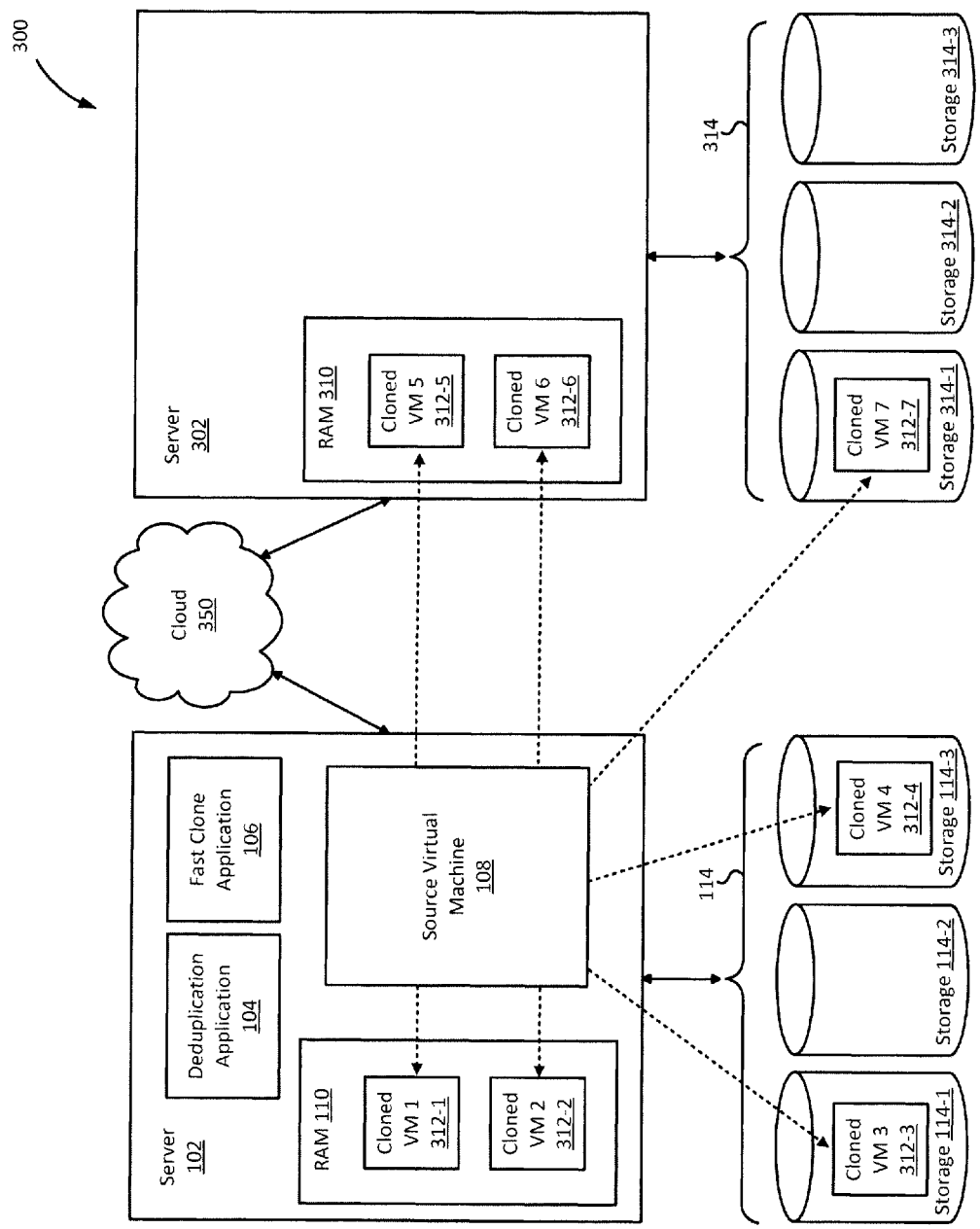
FIG. 3 illustrates an example of a network of servers to form new virtual machines from a source virtual machine through a cloud, according to some embodiments.

FIG. 3 illustrates an example of a network of servers to form new virtual machines from a source virtual machine through a cloud, according to some embodiments. Diagram 300 depicts an example of a network of servers to form new virtual machines based on a source virtual machine, such as described in relation to server 102 of FIG. 1, deduplication application 104 of FIG. 1, fast clone application 106 of FIG.

1, system memory (RAM) 110 of FIG. 1, source virtual machine 108 of FIG. 1, storage array 114 of FIG. 1, cloud 350, server 302, system memory (RAM) 310, storage array 314, and cloned VMs 312-1 to 312-7. In some embodiments, fast clone application 106 can be configured to receive data representing a request to clone source virtual machine 108 which has been deduplicated by deduplication application 104. In some embodiments, new virtual machines (e.g., cloned VM 312-1 and 312-2) can be formed in system memory (RAM) 110 in systems where RAM is configured to be used as permanent storage instead of its more conventional short term volatile usage. In some implementations, virtual machines VM 312-3 and 312-4 can be formed in local storage array 114. In at least one embodiment, virtual machines VM 312-5 and 312-6 can be formed remotely via cloud 350 in system memory (RAM) 310 of remote server 302. In some embodiments, server 302 may be configured to function as a backup or mirror of server 102. Virtual machine VM 312-7 can be formed in remote storage array 314 via cloud 350, according to some embodiments. In some embodiments, the number, type, configuration, topology, connections, or other aspects of network 300 may be implemented differently than shown or described.

Figures 4A, 4B:
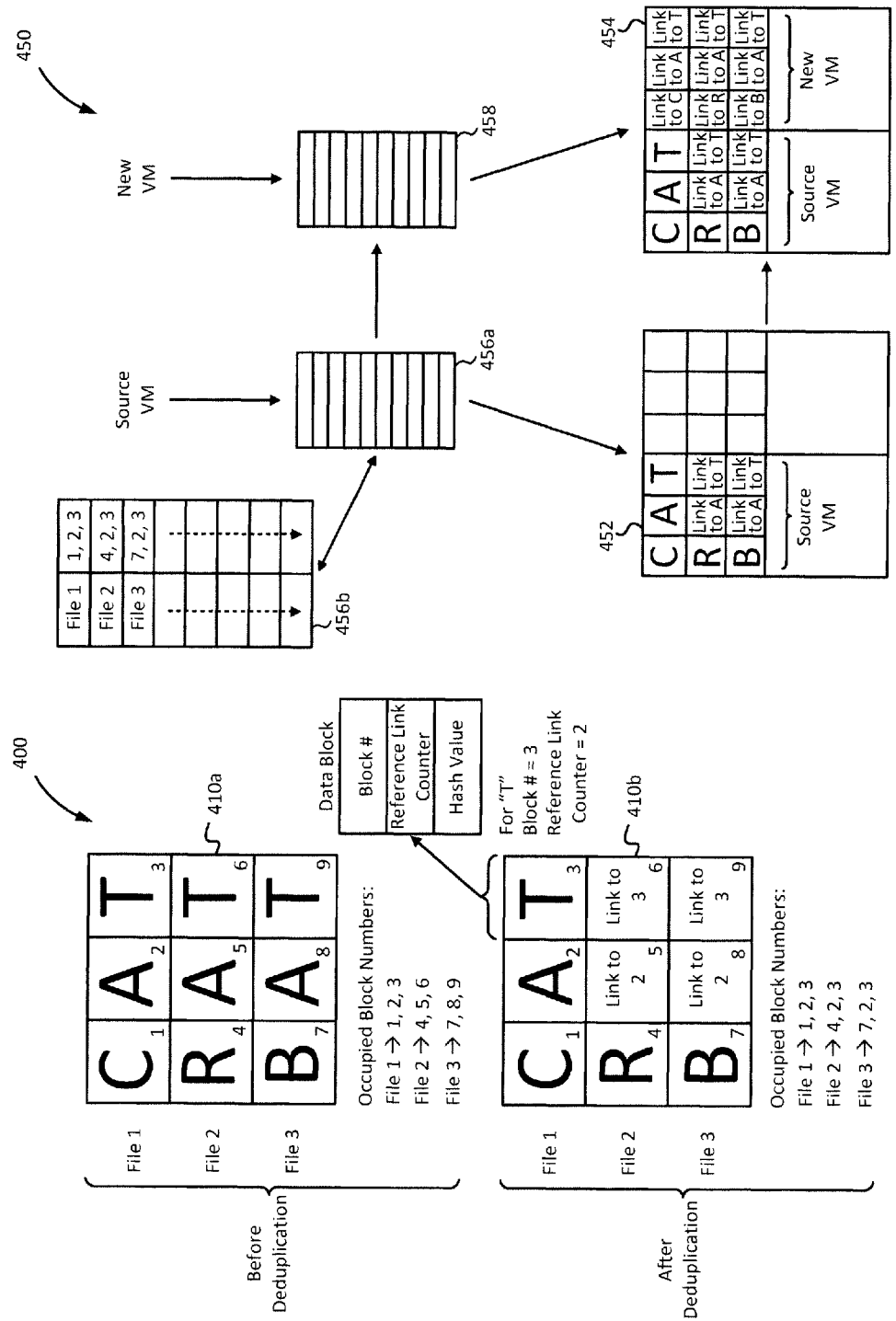
FIG. 4A illustrates a graphical representation of an example of deduplicating a virtual machine image, according to some embodiments.
FIG. 4B illustrates a graphical representation of an example of implementing a source virtual machine to form a new virtual machine, according to some embodiments.

FIG. 4A illustrates a graphical representation of an example of deduplicating a virtual machine image, according to some embodiments. Here, diagram 400 depicts an example of a data block, such as data block 410a that includes data blocks 1-9 and the files "CAT," "RAT," and "BAT" (see e.g., examples of representations of virtual machine image files) stored in the data blocks as shown, prior to deduplication. For example, the files "CAT," "RAT," and "BAT" each contains three chunks of data represented by the letters "C," "A," "T," "R," "A," "T," "B," "A," and "T," each chunk of data represented by the letters can be stored in separate data blocks 1-9 in a memory or data storage device (e.g., hard drive or RAM) (not shown). In some embodiments, data blocks 1-9 can be disposed contiguously or separately in a memory or data storage device. In the example of FIG. 4A, the files "CAT," "RAT," and "BAT" occupies nine different data blocks. For example, each letter (or data chunk) of the files "CAT," "RAT," and "BAT" can be one megabyte (MB) in size for a total of 9 MB and therefore occupies 9 MB of total space in the memory or storage device. Of the 9 MB of data from the previous example, there are three identical instances of data chunk "A" (in data blocks 2, 5, and 8) and three identical instances of data chunk "T" (in data blocks 3, 6, and 9), and two of the three identical instances of data chunks "A" (in data blocks 5 and 8) and "T" (in data blocks 6 and 9) can be said to be redundant or duplicate copies of the first instance of data chunk "A" (in data block 2) and data chunk "T" (in data block 3), respectively. In embodiments of a deduplication-based system, the two redundant or duplicate copies of data chunk "A" and data chunk "T" can be removed, and reference links (which can be in the form of block numbers) to the original data chunk "A" (in data block 2) and the original data chunk "T" (in data block 3) are implemented in their place. For example, any time a duplicate copy of data chunk "A" is removed, a link associating the removed data chunk "A" to block 2 (where the original data chunk "A" is stored) is implemented in its place, and any time a duplicate copy of data chunk "T" is removed, a link associating the removed data chunk "T" to block 3 (where the original data chunk "T" is stored) is implemented in its place. Furthering the example, instead of occupying 9 MB of total space in the memory or storage device, the files "CAT," "RAT," and "BAT" now occupies 5 MB of total space and frees up significant space in the memory or storage device.

Data block 410b is a graphical representation of an example of data block 410a after deduplication. In some embodiments, a deduplication process can remove redundant or duplicate copies of data chunks. For example, deduplication removes duplicate copies of data chunk "A" (in data blocks 5 and 8 in data block 410a) and implements a reference link (e.g., an association with a block number or an association with a location of a data block) associating the redundant or duplicate copies of data chunk "A" to the original data chunk "A" (in data block 2) and stores data representing the linking information in a deduplication metadata file, such as deduplication metadata file 456b described below in FIG. 4B. In some embodiments, the data blocks of a deduplicated file system may contain data representing information such as the block number, data associated with a hash value generated by a hashing function that uniquely identifies the data chunk in the data block, and data associated with a reference link counter to track the number of times a reference link is implemented to associate removed redundant data with the data block. For example, block 3 of data block 410b may contain data representing information describing the block number as "3," can include data that represents a hash value for data chunk "T," and data associated with a reference link count of two because two duplicate copies of data chunk "T" have been removed and linked to this original data chunk "T." Techniques associated with deduplication of virtual machine files are described in more detail in copending U.S. patent application Ser. No. 13/269,525, filed Oct. 7, 2011, entitled "Deduplication of Virtual Machine Files in a Virtualized Desktop Environment," which is incorporated herein by reference in its entirety for all purposes.

FIG. 4B illustrates a graphical representation of an example of implementing a source virtual machine to form a new virtual machine, according to some embodiments. Diagram 450 depicts an example of cloning a source virtual machine to form a virtual machine using the deduplication metadata of the source virtual machine. In some embodiments, deduplication metadata file 456b can be configured to include data representing a list of files and reference links (e.g., associations with block numbers or associations with locations of data blocks) to the data blocks where the data of the files are stored. In some implementations, if a file system is deduplication-based, some files may share data blocks with other files and result in multiple links to the same data block. For example, deduplication metadata file 456b can include data representing a list of virtual machine data files and their respective links (e.g., in the form of block numbers) to data blocks that store the data of the deduplicated virtual machine files. In some embodiments, if a file system is deduplication-based, duplicate instances of a file can be created without making a copy of the file itself. For example, duplicate instances of a file can be made by duplicating the deduplication metadata and the reference links of the file, and updating the number of times the data block (or blocks) of the file has been linked (a link to each data block of the file has been created for each new instance of a file). In some embodiments, updating the number of times the data block of a file has been linked could also be referred to as updating a reference link counter associated with the data block.

In some embodiments, duplicate instances of an entire virtual machine image can be formed or created by duplicating the deduplication metadata files associated with the virtual machine and without copying any data portions of the virtual machine itself. For example, to create a new virtual machine (or a new instance of a source virtual machine), deduplication metadata table 456a, which includes links to the data blocks where the source virtual machine data is stored, is duplicated to form deduplication metadata table 458, which includes new links to the data blocks where the source virtual machine data is stored (454). After an instance of the source virtual machine is formed, a reference link counter for each of the data blocks of the data of the source virtual machine is incremented by the fast clone application each time a new reference link to the data block is implemented to track the number of times removed redundant data is associated with the data block. In some implementations, the above-described technique for creating new instances of virtual machines from a source virtual machine may be referred to as fast clone or fast cloning.

Figure 5:
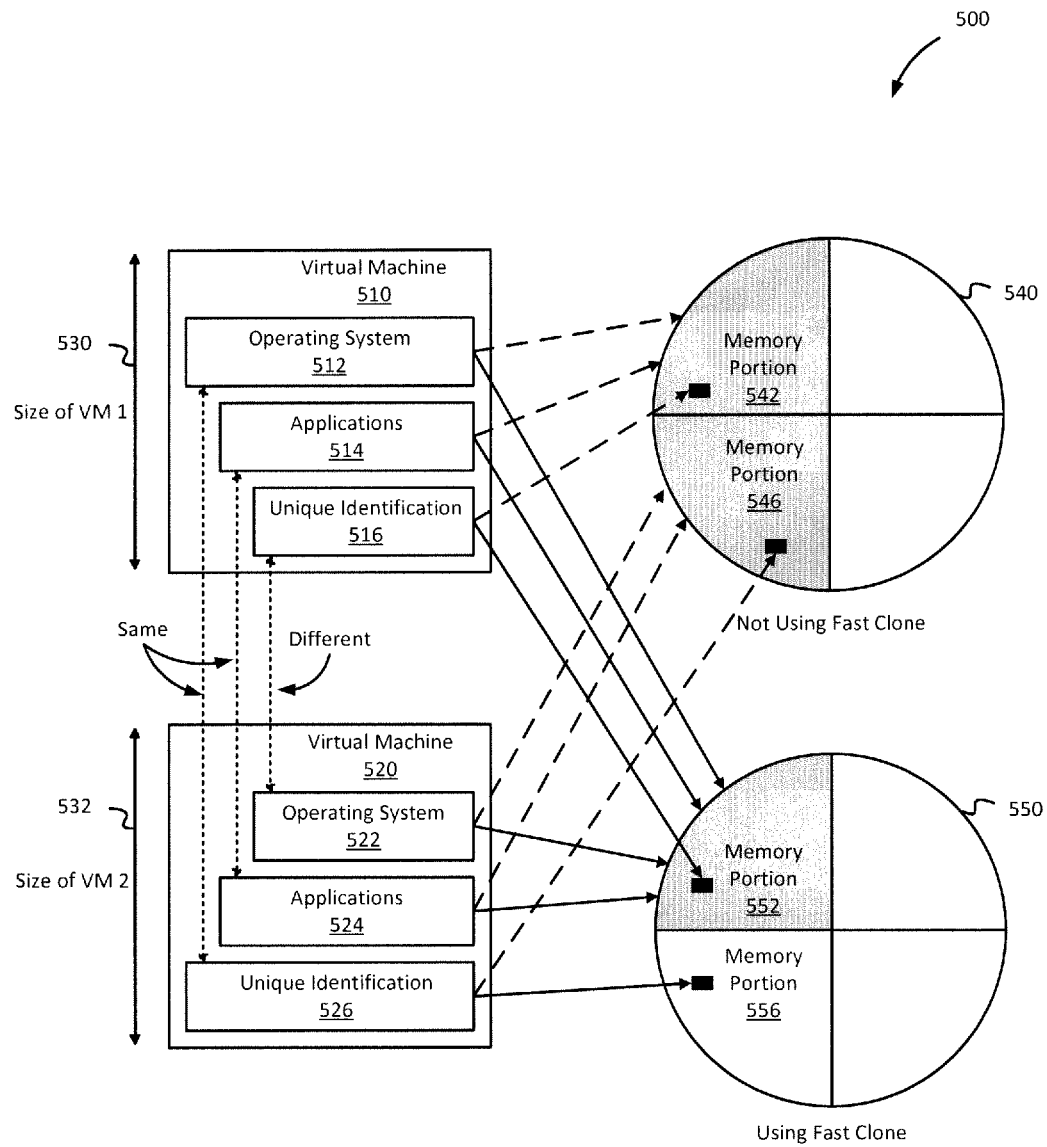
FIG. 5 illustrates a graphical representation of an example of fast cloning virtual machines using deduplication metadata, according to some embodiments.

FIG. 5 illustrates a graphical representation of an example of fast cloning virtual machines using deduplication metadata, according to some embodiments. Diagram 500 depicts virtual machine 510 associated with user A, which includes operating system 512, applications 514, and unique identification 516, and virtual machine 520 associated with user B, which includes operating system 522, applications 524, and unique identification 526, according to some embodiments. In some implementations, a bit-by-bit comparison of data representing virtual machine 510 associated with user A and data representing virtual machine 520 associated with user B can indicate that the two virtual machines are substantially identical with the exception of unique identification 516 and 526 that represent files that can be unique to one virtual machine, but not the other (e.g., system IDs, unique user authorization process, personal data files of the users). For example, operating system 512 (e.g., MICROSOFT WINDOWS® NT, MICROSOFT WINDOWS® 7, UNIX®, UNIX® based operating systems, MAC® OSX, and the like) of virtual machine 510 can be substantially the same as operating system 522 of virtual machine 520 if both virtual machines are running the same type of operating system. As another example, applications 514 (e.g., word processing, database management, system security, and the like) disposed in virtual machine 510 can be substantially the same as applications 524 disposed in virtual machine 520 if both virtual machines run the same type of applications (e.g., each virtual machine assigned to each employee of a company includes the same basic applications). In some embodiments, because virtual machines 510 and 520 can be substantially the same, fast cloning processes using deduplication metadata can be used to create instances of virtual machines based on a source virtual machine without copying any portions of data representing the files of the source virtual machine. After an instance of a virtual machine is formed by duplicating the deduplication metadata file of the source virtual machine, data that is independent of the source virtual machine (such as unique identification 526) can be added to the new virtual machine, according to some implementations. For example, virtual machine 510 can be configured to be used as the deduplicated source virtual machine and occupies memory portion 552 in storage device 550. When virtual machine 510 is fast cloned to create a new instance of virtual machine, such as virtual machine 520, both source virtual machine 510 and new instance virtual machine 520 occupies memory portion 552, with the exception of unique identification 526 for new instance virtual machine 520, which is added to a memory portion 556 of storage device 550. An example of creating a new virtual machine using a technique other than fast clone or any of the new virtual machine forming (or cloning) techniques described herein can be shown in storage device 540, which shows source virtual machine 510, which is stored in memory portion 542, being copied in its entirety to form virtual machine 520, which is stored in memory portion 546, resulting in virtual machines 510 and 520 utilizing twice as much storage space.

Figure 6:
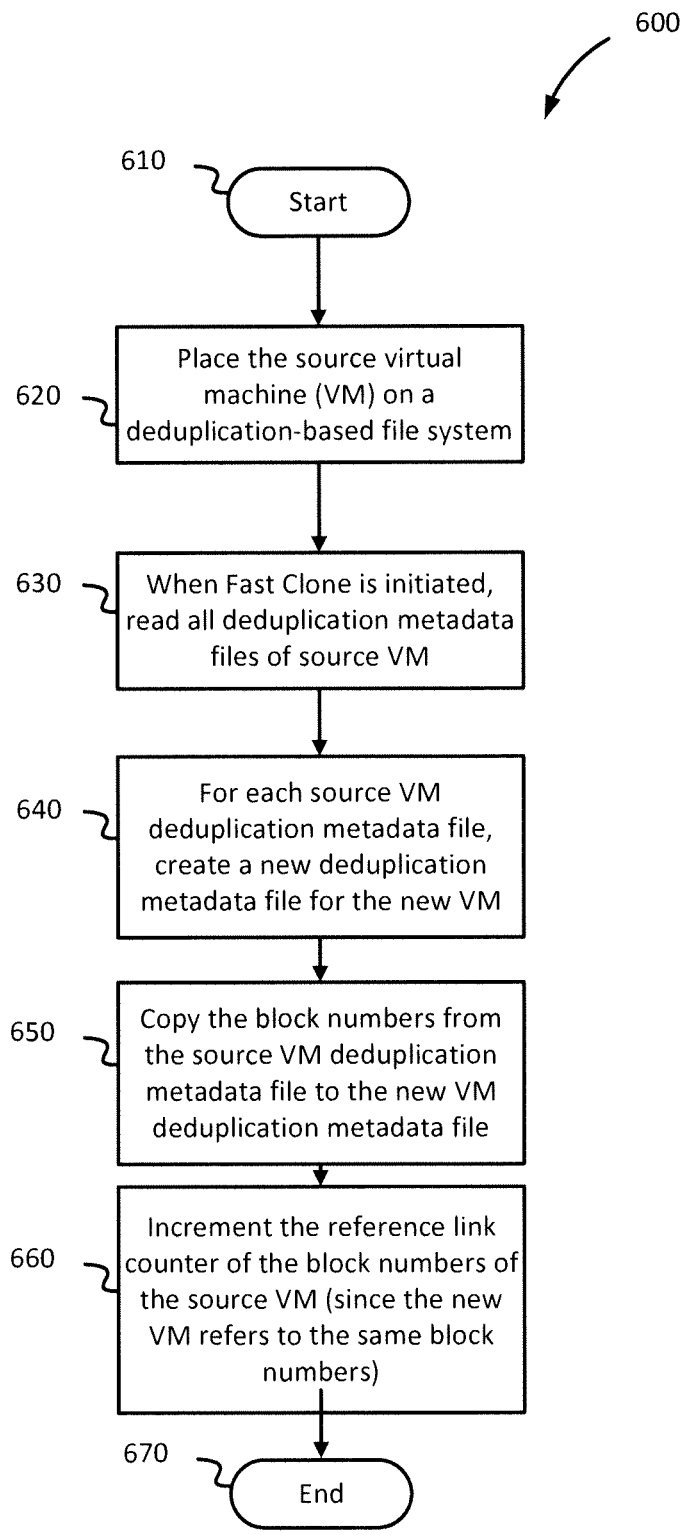
FIG. 6 illustrates an example of a flow to fast clone a source virtual machine using deduplication metadata, according to some embodiments.

FIG. 6 illustrates an example of a flow to fast clone a source virtual machine using deduplication metadata, according to some embodiments. Flow 600 starts at 610. At 620, a copy of a source virtual machine is loaded on to a deduplication-based file system or server. At 630, data representing a fast clone request is received and the fast cloning process is initiated. When the fast cloning process is initiated, all of the deduplication metadata files of the source virtual machine are read. Examples of deduplication metadata files are, but not limited to, inode tables in UNIX-based file systems and master file tables in Windows-based file systems, among others. At 640, for each source virtual machine deduplication metadata file, a new deduplication metadata file is created for the new virtual machine. At 650, the block numbers from the source virtual machine deduplication metadata files are copied to the deduplication metadata file of the new virtual machine. At 660, increment the reference link counter of each of the block numbers of the source virtual machine each time a reference link to each block number is implemented to track the number of reference links associated with the data block since the new virtual machine links to the same physical data as the source virtual machine. The flow ends at 670.

Figure 7:
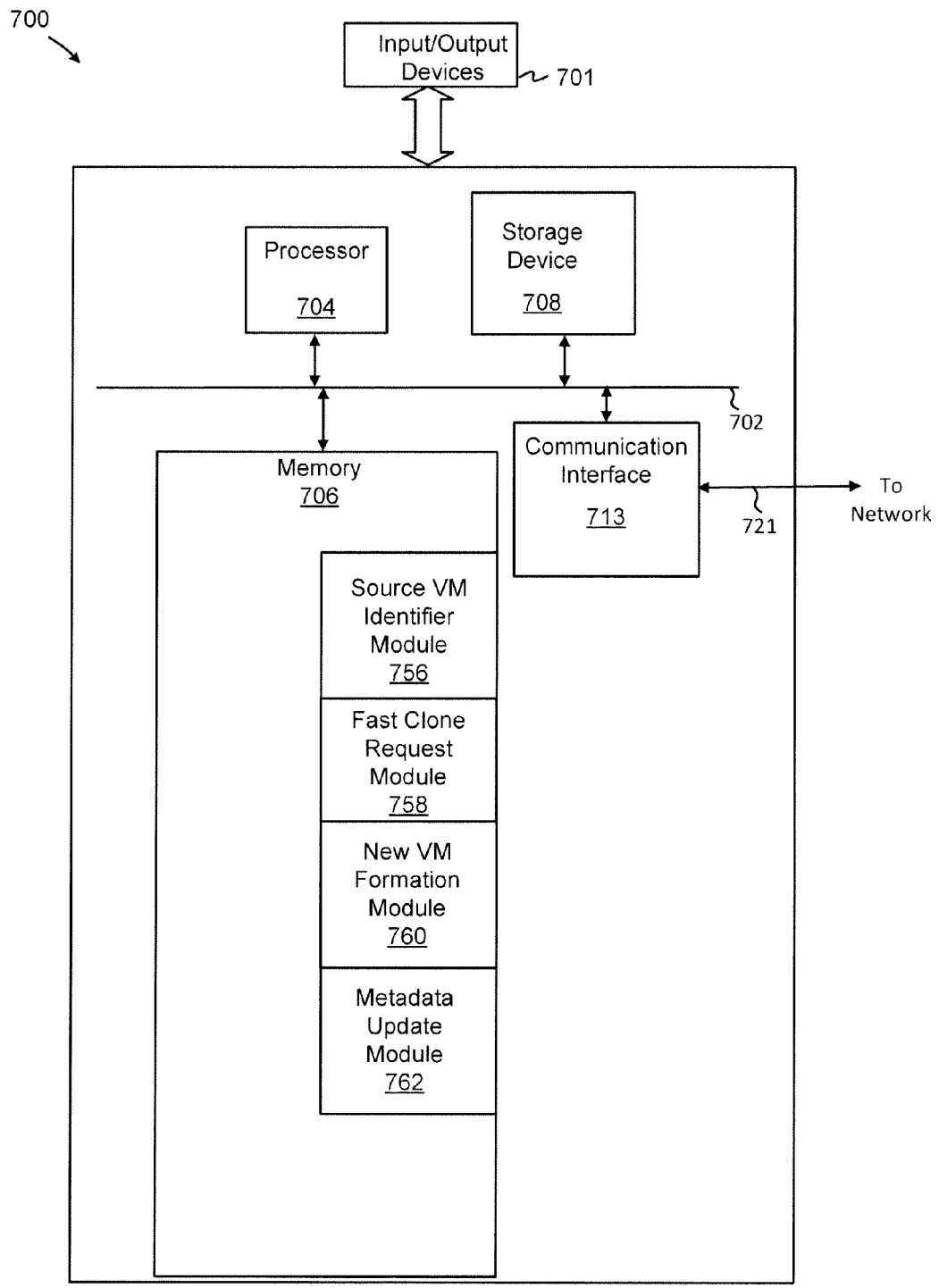
FIG. 7 illustrates an example of a computing platform to fast clone a source virtual machine in accordance with various embodiments.

FIG. 7 illustrates an example of a computing platform to fast clone a source virtual machine in accordance with various embodiments. In some examples, computing platform 700 may be used to implement computer programs, applications, methods, processes, algorithms, or other software to perform the above-described techniques. Computing platform 700 includes a bus 702 or other communication mechanism for communicating information, which interconnects subsystems and devices, such as processor 704, system memory 706 (e.g., RAM, etc.), storage device 708 (e.g., ROM, etc.), a communication interface 713 (e.g., an Ethernet or wireless controller, a Bluetooth controller, etc.) to facilitate communications via a port on communication link 721 to communicate, for example, with a computing device, including mobile computing and/or communication devices with processors. Processor 704 can be implemented with one or more central processing units ("CPUs"), such as those manufactured by Intel® Corporation, or one or more virtual processors, as well as any combination of CPUs and virtual processors. Computing platform 700 exchanges data representing inputs and outputs via input-and-output devices 701, including, but not limited to, keyboards, mice, audio inputs (e.g., speech-to-text devices), user interfaces, displays, monitors, cursors, touch-sensitive displays, LCD or LED displays, and other I/O-related devices.

According to some examples, computing platform 700 performs specific operations by processor 704 executing one or more sequences of one or more instructions stored in system memory 706, and computing platform 700 can be implemented in a client-server arrangement, peer-to-peer arrangement, or as any mobile computing device, including smart phones and the like. Such instructions or data may be read into system memory 706 from another computer readable medium, such as storage device 708. In some examples, hard-wired circuitry may be used in place of or in combination with software instructions for implementation. Instructions may be embedded in software or firmware. The term "computer readable medium" refers to any tangible medium that participates in providing instructions to processor 704 for execution. Such a medium may take many forms, including but not limited to, non-volatile media and volatile media. Non-volatile media includes, for example, optical or magnetic disks and the like. Volatile media includes dynamic memory, such as system memory 706.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 702 for transmitting a computer data signal.

In some examples, execution of the sequences of instructions may be performed by computing platform 700. According to some examples, computing platform 700 can be coupled by communication link 721 (e.g., a wired network, such as LAN, PSTN, or any wireless network) to any other processor to perform the sequence of instructions in coordination with (or asynchronous to) one another. Computing platform 700 may transmit and receive messages, data, and instructions, including program code (e.g., application code) through communication link 721 and communication interface 713. Received program code may be executed by processor 704 as it is received, and/or stored in memory 706 or other non-volatile storage for later execution.

In the example shown, system memory 706 can include various modules that include executable instructions to implement functionalities described herein. In the example shown, system memory 706 includes a source virtual machine identifier module 756, a fast clone request module 758, a new virtual machine formation module 760, and a metadata update module 762, any of which can be configured to provide one or more functions described herein.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed:

1. A method, comprising:
receiving a request to copy a first virtual machine to form a second virtual machine, the first virtual machine comprising: a first unique identification data associated with the first virtual machine, deduplication metadata describing deduplicated data for an operating system and at least one application;
identifying a first portion of memory comprising the deduplication metadata for the first virtual machine;
forming the second virtual machine based on a portion of the deduplication metadata from the first portion of memory, wherein forming the second virtual machine further comprises:
linking the second virtual machine to the portion of the deduplication metadata corresponding to the operating system and the at least one application by copying one or more files from the first portion of memory comprising the deduplication metadata associated with the deduplicated data for the first virtual machine, and
implementing a second portion of memory to store a second unique identification data for the second virtual machine independent of the first unique identification data associated with the first virtual machine; and
modifying a reference link counter each time the one or more files comprising deduplication metadata associated with the deduplicated data for the first virtual machine is copied.

2. The method of claim 1, wherein identifying the first portion of memory comprising data for the first virtual machine further comprises:
identifying one or more files for deduplication metadata associated with deduplicated data for the first virtual machine; and
locating the deduplicated data for the first virtual machine in the first portion of memory based on the deduplication metadata associated with the deduplicated data for the first virtual machine.

3. The method of claim 2, wherein the deduplication metadata associated with the deduplicated data for the first virtual machine comprises a block number, the reference link counter associated with the block number, and a hash value.

4. The method of claim 3, wherein the block number is associated with a location of a physical data block including a portion of the data for the first virtual machine.

5. The method of claim 3, wherein the reference link counter indicates a number of times the block number is linked.

6. The method of claim 1, wherein the second unique identification data for the second virtual machine comprises at least a system identifier.

7. The method of claim 1, wherein the second unique identification data for the second virtual machine is accessible via a different authorization process than the first virtual machine.

8. A system, comprising:
a first portion of a first memory configured to store data for a first virtual machine comprising a first unique identification data associated with the first virtual machine and deduplication metadata describing deduplicated data for an operating system and at least one application;
a processor configured to receive a request to copy the first virtual machine to form a second virtual machine and to form the second virtual machine based on a portion of the deduplication metadata associated with the data for the first virtual machine, the processor being further configured to link the second virtual machine to the portion of the deduplication metadata corresponding to the operating system and the at least one application from the data for the first virtual machine stored in the first portion of the memory by copying one or more files comprising the deduplication metadata associated with the deduplicated data for the first virtual machine; and a second portion of a second memory configured to store a second unique identification data for the second virtual machine independent of the first unique identification data associated with the first virtual machine, and wherein the processor modifies a reference link counter each time the one or more files comprising deduplication metadata associated with the deduplicated data for the first virtual machine is copied.

9. The system of claim 8, wherein the processor is further configured to identify one or more files for the deduplication metadata associated with deduplicated data for the first virtual machine and to locate the deduplicated data for the first virtual machine in the first portion of the first memory based on the deduplication metadata associated with the deduplicated data for the first virtual machine.

10. The system of claim 9, wherein the deduplication metadata associated with the deduplicated data for the first virtual machine comprises:
   a block number;
   the reference link counter associated with the block number; and
   a hash value.

11. The system of claim 10, wherein the block number indicates a location of a physical data block associated with the data for the first virtual machine.

12. The system of claim 10, wherein the reference link counter indicates a number of times the block number is linked.

13. The system of claim 8, wherein the second unique identification data for the second virtual machine comprises at least a system identifier.

14. The system of claim 8, wherein the second unique identification data for the second virtual machine is accessible via a different authorization process than the first virtual machine.

\* \* \* \* \*